(12) United States Patent
Ballocchi et al.

(10) Patent No.: US 12,145,731 B2
(45) Date of Patent: Nov. 19, 2024

(54) AIRCRAFT SEAT BASE ASSEMBLY

(71) Applicant: B/E Aerospace, Inc., Winston-Salem, NC (US)

(72) Inventors: Paolo Ballocchi, Newcastle (GB); Damian Christie, Belfast (GB); Nigel McKibbin, Banbridge (GB); Andrew W. Blackwood, Belfast (GB); Deepa Jose, Belfast (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 195 days.

(21) Appl. No.: 17/544,734

(22) Filed: Dec. 7, 2021

(65) Prior Publication Data

US 2023/0174239 A1    Jun. 8, 2023

(51) Int. Cl.
*B64D 11/06* (2006.01)

(52) U.S. Cl.
CPC ...... *B64D 11/0648* (2014.12); *B64D 11/0696* (2013.01); *B64D 11/0649* (2014.12)

(58) Field of Classification Search
CPC ................................................ B64D 11/0648
See application file for complete search history.

(56) References Cited

U.S. PATENT DOCUMENTS

| | | | |
|---|---|---|---|
| 7,954,762 B2 | 6/2011 | Boren et al. | |
| 8,205,833 B2 | 6/2012 | Kismarton et al. | |
| 8,550,564 B1 | 10/2013 | Kismarton et al. | |
| 9,090,352 B2 | 7/2015 | Saada et al. | |
| 9,487,118 B2 * | 11/2016 | Matsumoto | B60N 2/68 |
| 9,493,192 B2 | 11/2016 | Baudard et al. | |
| 10,059,456 B2 | 8/2018 | Le et al. | |
| 10,112,720 B2 | 10/2018 | Maslakow | |

(Continued)

FOREIGN PATENT DOCUMENTS

| | | |
|---|---|---|
| CN | 106927052 A | 7/2017 |
| CZ | 2018387 A3 | 2/2020 |

(Continued)

OTHER PUBLICATIONS

Alwekar et al., "Manufacturing and characterization of continuous fiber-reinforced thermoplastic tape overmolded long fiber thermoplastic". Composites Part B: Engineering, vol. 207, 2021, 108597, ISSN 1359-8368, Retrieved from Internet.

(Continued)

*Primary Examiner* — Timothy J Brindley
(74) *Attorney, Agent, or Firm* — Suiter Swantz IP

(57) ABSTRACT

A base assembly for an aircraft seat is disclosed. The base assembly may include one or more leg sub-assemblies. Each leg sub-assembly may include a front leg, a rear leg, and a link beam configured to couple the front leg to a portion of the rear leg. At least one of the front leg or the rear leg being at least partially formed of a hybrid composite structure. The link beam being at least partially formed of the hybrid composite structure. The hybrid composite structure formed of at least a first material and a second material, where the first material is different from the second material, the first material including a thermoplastic material configured to provide ductility for the base assembly, the second material being a composite material configured to provide strength for the base assembly.

13 Claims, 12 Drawing Sheets

(56) References Cited

U.S. PATENT DOCUMENTS

| | | | |
|---|---|---|---|
| 10,124,899 B2 | 11/2018 | Mansouri et al. | |
| 10,343,780 B2 | 7/2019 | Portoles et al. | |
| 10,603,872 B2 | 3/2020 | Gruhn et al. | |
| 10,766,174 B2 | 9/2020 | Maslakow | |
| 11,008,107 B2 | 5/2021 | Smith et al. | |
| 2010/0003534 A1 | 1/2010 | Luetzeler et al. | |
| 2010/0187894 A1 | 7/2010 | Kismarton et al. | |
| 2017/0217347 A1* | 8/2017 | McKibbin | B29C 45/14336 |
| 2019/0135137 A1 | 5/2019 | Jameson et al. | |
| 2020/0317349 A1 | 10/2020 | Achilles et al. | |

FOREIGN PATENT DOCUMENTS

| | | | | |
|---|---|---|---|---|
| DE | 102016102707 A1 * | 8/2017 | | B60N 2/68 |
| DE | 102020106035 A1 * | 9/2021 | | B64D 11/0636 |
| EP | 1795444 B1 | 7/2013 | | |
| EP | 3689750 A1 * | 8/2020 | | B60N 2/2209 |
| EP | 3732102 A1 | 11/2020 | | |
| GB | 2477234 B | 1/2012 | | |
| KR | 20150113967 A | 10/2015 | | |
| WO | 2010112875 A2 | 10/2010 | | |
| WO | 2017021485 A1 | 2/2017 | | |
| WO | 2018089056 A1 | 5/2018 | | |
| WO | WO-2021021162 A1 * | 2/2021 | | B60N 2/015 |

OTHER PUBLICATIONS

Extended European Search Report dated May 10, 2023; European Application No. 22209140.7.

* cited by examiner

AIRCRAFT SEAT BASE ASSEMBLY

BACKGROUND

The build of the seat (and any included components within the build) may be required to meet guidelines and/or standards. For example, in select industries, the seat must be able to withstand inertial, dynamic, abuse, fatigue, and other load requirements as set forth by the industry guidelines and/or standards.

SUMMARY

A base assembly for an aircraft seat is disclosed, in accordance with one or more embodiments of the present disclosure. The base assembly includes one or more leg sub-assemblies. Each leg sub-assembly comprises a front leg. Each leg sub-assembly comprises a rear leg. Each leg sub-assembly comprises a link beam configured to couple the front leg to a portion of the rear leg. At least one of the front leg or the rear leg being at least partially formed of a hybrid composite structure, the link beam being at least partially formed of the hybrid composite structure. The hybrid composite structure formed of at least a first material and a second material, where the first material is different from the second material, the first material including a thermoplastic material configured to provide ductility for the base assembly, the second material including a composite material configured to provide strength for the base assembly. The hybrid composite structure including one or more first portions formed of the first material and one or more second portions of the second material, where the second material is over-molded by one or more portions of the first material to form one or more belts of the second material on the first material.

In some embodiments, the thermoplastic material may include polyether ether ketone (PEEK).

In some embodiments, the thermoplastic material may include a cycloaliphatic diamine dodecanedioic acid based thermoplastic material.

In some embodiments, the composite material may include a continuous fiber material.

In some embodiments, the continuous fiber material may be formed of carbon fibers.

In some embodiments, a first portion of the link beam may be integrated with the front leg and a second portion of the link beam may be integrated with the rear leg to form an integrated leg sub-assembly.

In some embodiments, the front leg may include a first connection portion of the one or more connection portions and the rear leg may include a second portion of the one or more connection portions, the link beam may be configured to couple the first connection portion of the front leg to the second connection portion of the rear leg.

In some embodiments, the first connection portion of the front leg may be formed of a thermoplastic material and the second connection portion of the rear leg may be formed of a thermoplastic material.

In some embodiments, the front leg may be formed of at least one of a metal alloy, a thermoplastic material, or a composite material.

In some embodiments, the rear leg may include an opening configured to couple to a rear structure beam of an aircraft seat, the opening may be formed of the first material.

In some embodiments, the front leg may include an opening configured to couple to a front structure beam of an aircraft seat, the opening may be formed of the first material.

In some embodiments, the base assembly may further include one or more track covers and one or more floor fittings.

In some embodiments, the rear leg may include one or more raised portions formed of the first material.

In some embodiments, the rear leg may include a raised portion where the rear leg couples to a floor fitting connection portion of the base assembly, the floor fitting connection portion may be configured to couple to a portion of a floor fitting of the one or more floor fittings to couple the base assembly to a floor of an aircraft cabin.

An aircraft seat is disclosed, in accordance with one or more embodiments of the present disclosure. The aircraft seat includes a seatback. The aircraft seat includes a seat pan. The aircraft seat includes a base assembly couplable to a floor of an aircraft cabin via one or more floor fittings. The base assembly includes one or more leg sub-assemblies. Each leg sub-assembly comprises a front leg. Each leg sub-assembly comprises a rear leg. Each leg sub-assembly comprises a link beam configured to couple the front leg to a portion of the rear leg. At least one of the front leg or the rear leg being at least partially formed of a hybrid composite structure, the link beam being at least partially formed of the hybrid composite structure. The hybrid composite structure formed of at least a first material and a second material, where the first material is different from the second material. The hybrid composite structure including one or more first portions formed of the first material and one or more second portions formed of the second material, where the second material is over-molded by one or more portions of the first material to form one or more belts of the second material on the first material. The first material including a thermoplastic material configured to provide ductility for the base assembly, the second material including a composite material configured to provide strength for the base assembly.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
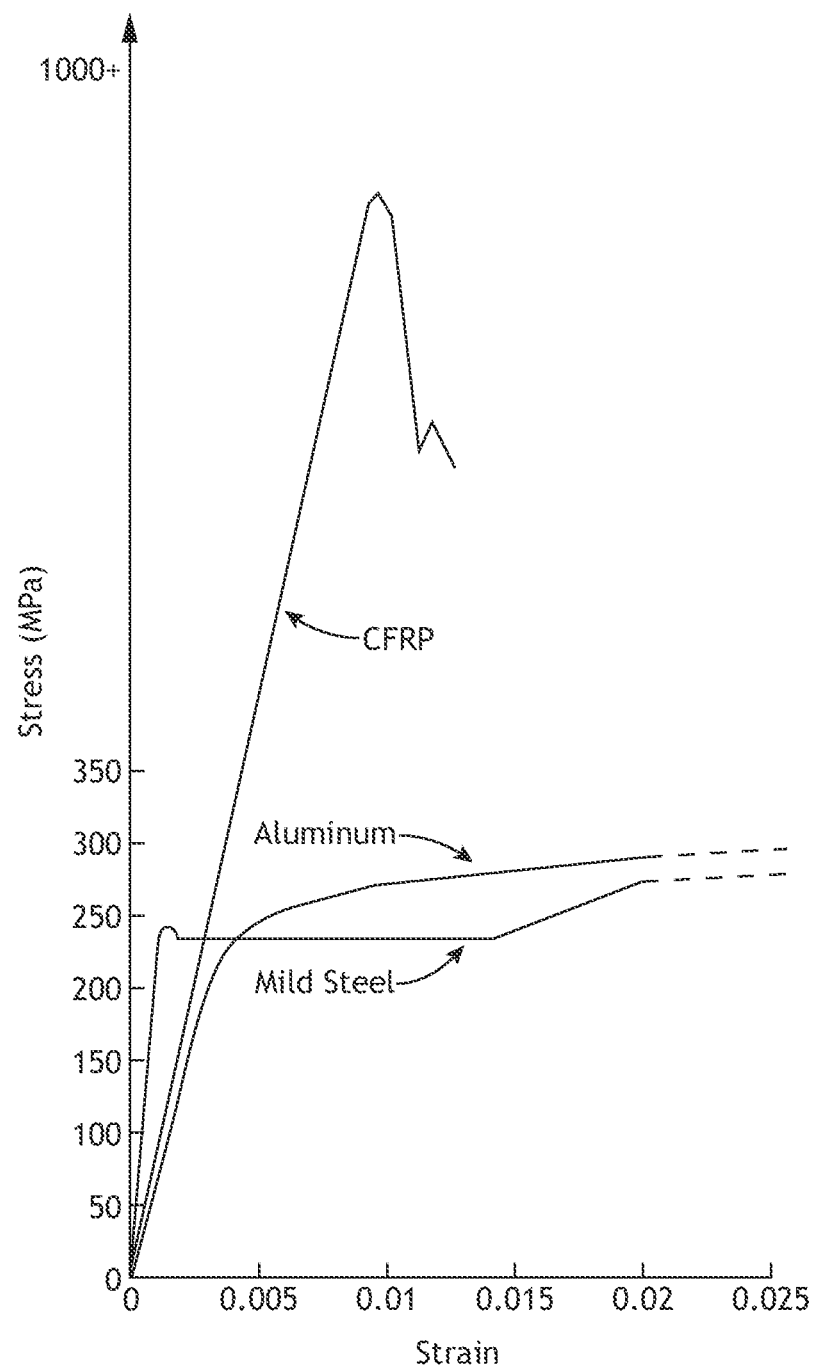
FIG. 1A illustrates a stress-strain curve of relevant materials used in aircraft seat-frame structures.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Seats may include components such as, but not limited to, a seatback, a seat pan, and a base assembly (e.g., a primary structure). In select industries the build of the seat (and any included components within the build) may be required to meet guidelines and/or standards. For example, the select aircraft seats must be formed of a material ductile enough to absorb energy. Further, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), or any other standards setting organization or company; or any other guidelines agency or organization; or the like. The base assembly may present difficulties such as, but not limited to, failing to meet load requirements (e.g., abuse, reliability, and dynamic load requirements (e.g., 4G lateral and 16 g FWD load requirements)), or the like as set forth by the FAA in 14 C.F.R. Part 25, AIRWORTHINESS STANDARDS: TRANSPORT CATEGORY AIRPLANES)).

Figure 1B:
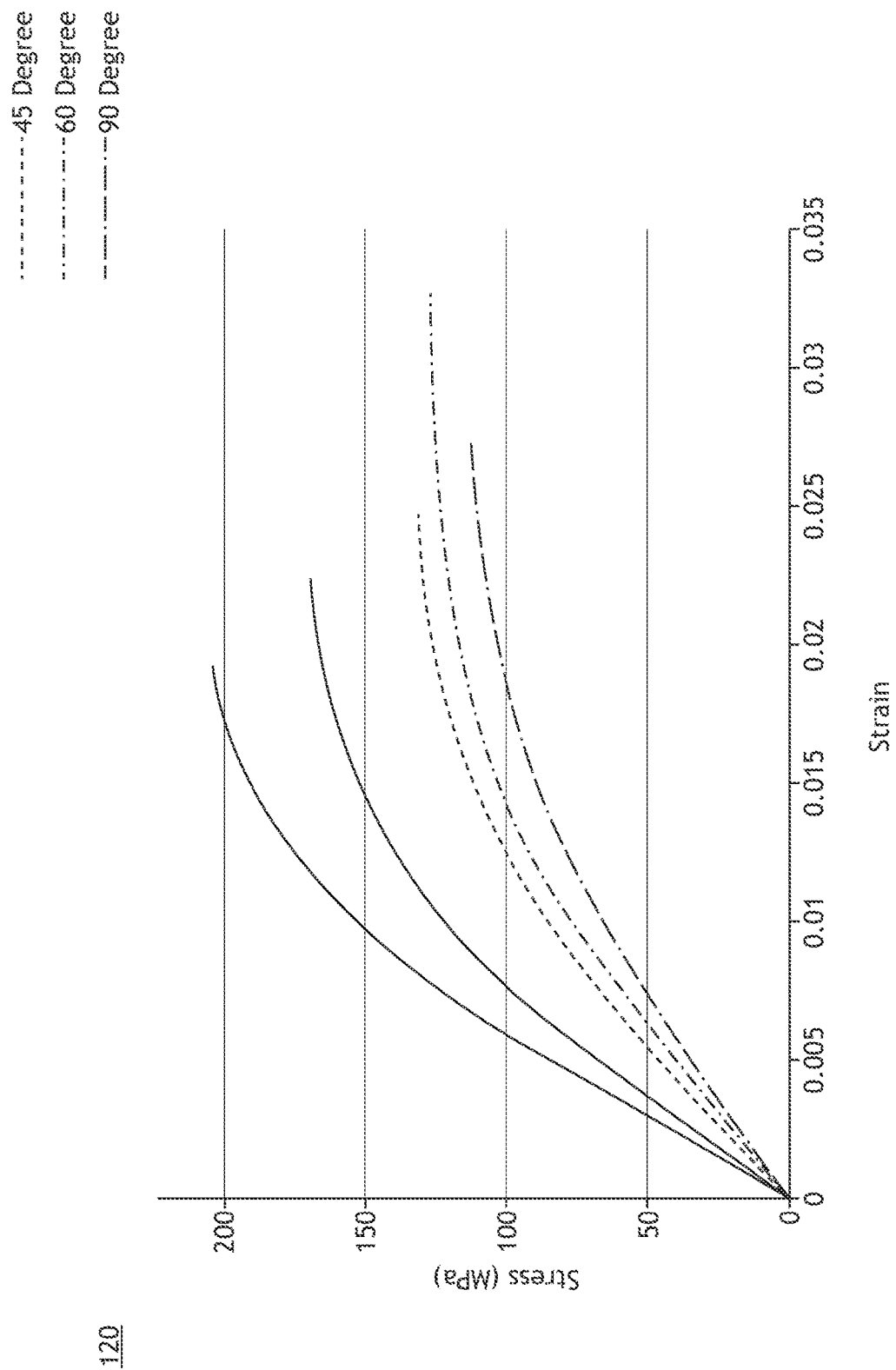
FIG. 1B illustrates a stress-strain curve of a carbon filled thermoplastic material at different levels of anisotropy.

Continuous fibers, such as carbon, are occasionally used in the build of aircraft seats. Although continuous fibers (e.g., CFRP) may withstand the load requirements (e.g., abuse, reliability, and dynamic load requirements (e.g., 4G lateral and 16 g FWD load requirements)), continuous fibers (e.g., carbon) cannot absorb enough energy (i.e., cannot deliver ductility) (as shown in FIGS. 1A-1B). Alternatively, thermoplastic injection molded materials are occasionally used in the build of aircraft seats. Although thermoplastic injection molded materials deliver ductility, the thermoplastic injection molded materials cannot withstand the load requirements (e.g., abuse, reliability, and dynamic load requirements (e.g., 4G lateral and 16 g FWD load requirements)). Further, metal alloys (e.g., aluminum and mild steel, as shown in FIG. 1A) conventionally are used in the build of aircraft seats and deliver both strength and ductility, however, metal alloys increase the cost and weight of the aircraft seat and it is often desirable to reduce the cost and weight of the seat.

As such, it would be desirable to provide an aircraft seat base assembly configured to address one or more shortcomings of the previous approaches. The assembly should be configured in accordance with aviation guidelines and/or standards. For example, the assembly should meet load requirements (e.g., abuse, reliability, and dynamic load requirements (e.g., 4G lateral and 16 g FWD load requirements)). Further, the assembly should have high energy absorption capabilities and meet ductility requirements. The assembly should reduce the cost and weight of the seat.

FIGS. 2A-7 in general illustrate an aircraft seat base assembly for an aircraft seat, in accordance with one or more embodiments of the disclosure.

Figure 2A:
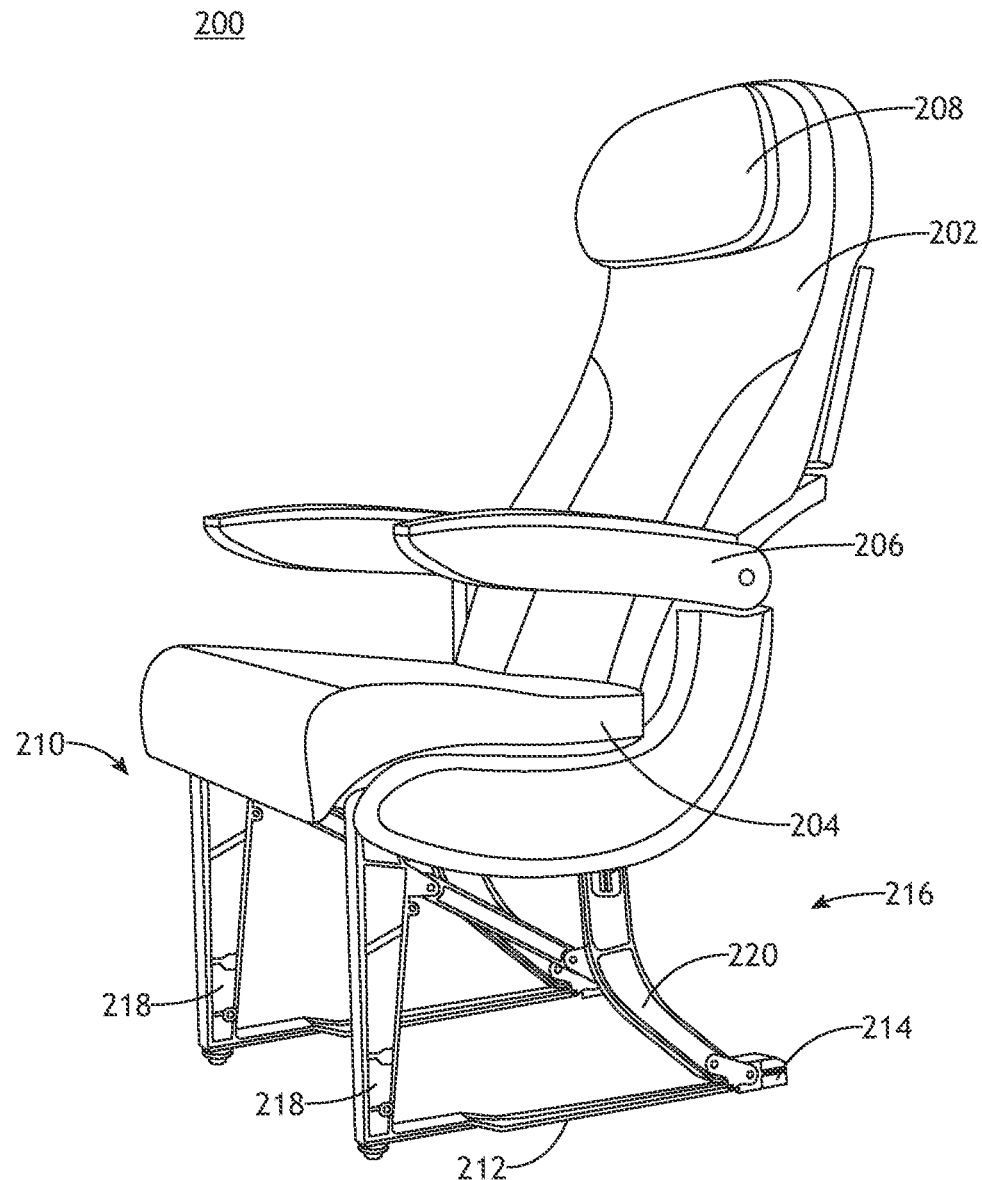
FIG. 2A illustrates a perspective view of an aircraft seat including a base assembly, in accordance with one or more embodiments of the disclosure.

Referring in general to FIGS. 2A-7, a base assembly may be integrated within an aircraft seat 200 installed within an aircraft cabin. For example, as shown in FIG. 2A, the one or more base assemblies may be integrated within an individual aircraft seat 200 installed within an aircraft cabin. By way of another example, as shown in FIG. 2B, the one or more base assemblies may be integrated within a row of aircraft seats 200 installed within an aircraft cabin. It is noted that FIGS. 2A-2B are provided merely for illustrative purposes and shall not be construed as limiting the scope of the present disclosure.

The aircraft seat 200 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

The aircraft seat 200 may be rotatable about an axis (e.g., swivelable). The aircraft seat 200 may be fully positionable between the outer limits of motion as defined by the moveable components of the aircraft seat 200. Where the aircraft seat 200 is installed within a passenger compartment, the aircraft seat 200 may be fully positionable between the outer limits of motion as defined by one or more passenger compartment monuments of the passenger compartment. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 200 may be actuatable (e.g., translatable and/or rotatable) from the TTL position to a non-TTL position, and/or vice versa. Further, it is noted the aircraft seat 200 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 200 may be translatable (e.g., trackable or slidable). The aircraft seat 200 may be rotatable about an axis cross-wise through the aircraft seat 200 into a position including, but not limited to, the upright or raised position, one or more lounge or reclined positions, and a lie-flat or bed position. For example, the aircraft seat 200 may transition directly between the upright or raised position and the lie-flat or bed position. By way of another example, it is noted the aircraft seat 200 may transition through one or more lounge or reclined positions between the upright or raised position and the lie-flat or bed position. By way of another example, the aircraft seat 200 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 200 may include a seatback 202. The aircraft seat 200 may include a seat pan 204. The aircraft seat 200 may include one or more arms 206.

The seatback 202 may include a headrest 208. For example, the headrest 208 may be integrated within the seatback 202. By way of another example, the headrest 208 may be a separate component coupled to (or inserted into) the seatback 202. For instance, the headrest 208 may be movable relative to the seatback frame of the aircraft seat 200 (e.g., adjustable, removable, or the like).

The aircraft seat 200 may be coupled to a base assembly 210 (such as the base assembly shown in FIGS. 3A-7). For example, the seat frame of the aircraft seat 200 may be couplable to the base assembly 210. The base assembly 210 may be couplable to a floor of an aircraft cabin. For example, the base assembly 210 may be couplable to a floor of an aircraft cabin via one or more tracks (not shown), one or more track covers 212, and/or one or more floor fittings 214 (or track fasteners 214).

The base assembly 210 may include one or more leg sub-assemblies 216. Each leg sub-assembly 216 may include one or more legs. For example, each leg sub-assembly 216 may include a front leg 218 and a rear leg 220.

Figure 2B:
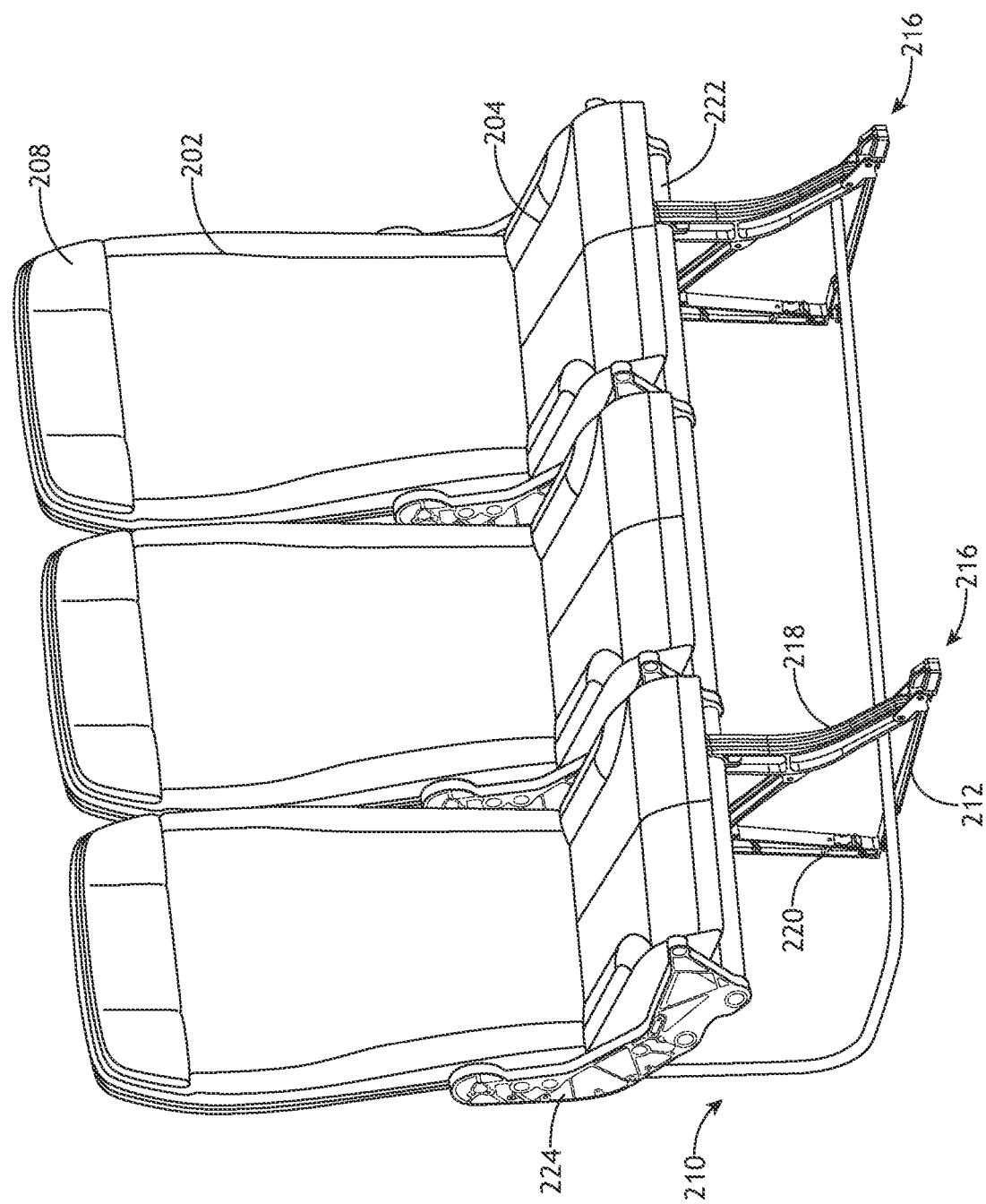
FIG. 2B illustrates a perspective view of a row of aircraft seats including a base assembly, in accordance with one or more embodiments of the disclosure.

Referring to FIG. 2A, the one or more legs may be couplable to one or more portions of the seat frame of the aircraft seat 200. For example, the one or more front legs 218 may be couplable to a front portion of the seat frame of the aircraft seat 200. By way of another example, the one or more rear legs 220 may be couplable to a rear portion of the seat frame of the aircraft seat 200. Referring to FIG. 2B, the one or more legs may be couplable to one or more structural beams 222 and/or one or more spreaders 224. For example, the one or more front legs 218 may be couplable to a front structural beam of the one or more structural beams 222 and a front portion of the one or more spreaders 224 (e.g., a front opening). By way of another example, the one or more rear legs 220 may be couplable to a rear structural beam of the one or more structural beams 222 and a rear portion of the one or more spreaders 224 (e.g., a rear opening). In this regard, the one or more legs 218, 220 may be configured to attach to the one or more structural beams 222 and secure to the one or more tracks 212 located in the floor of the aircraft cabin via the one or more fittings 214.

Figure 3A:
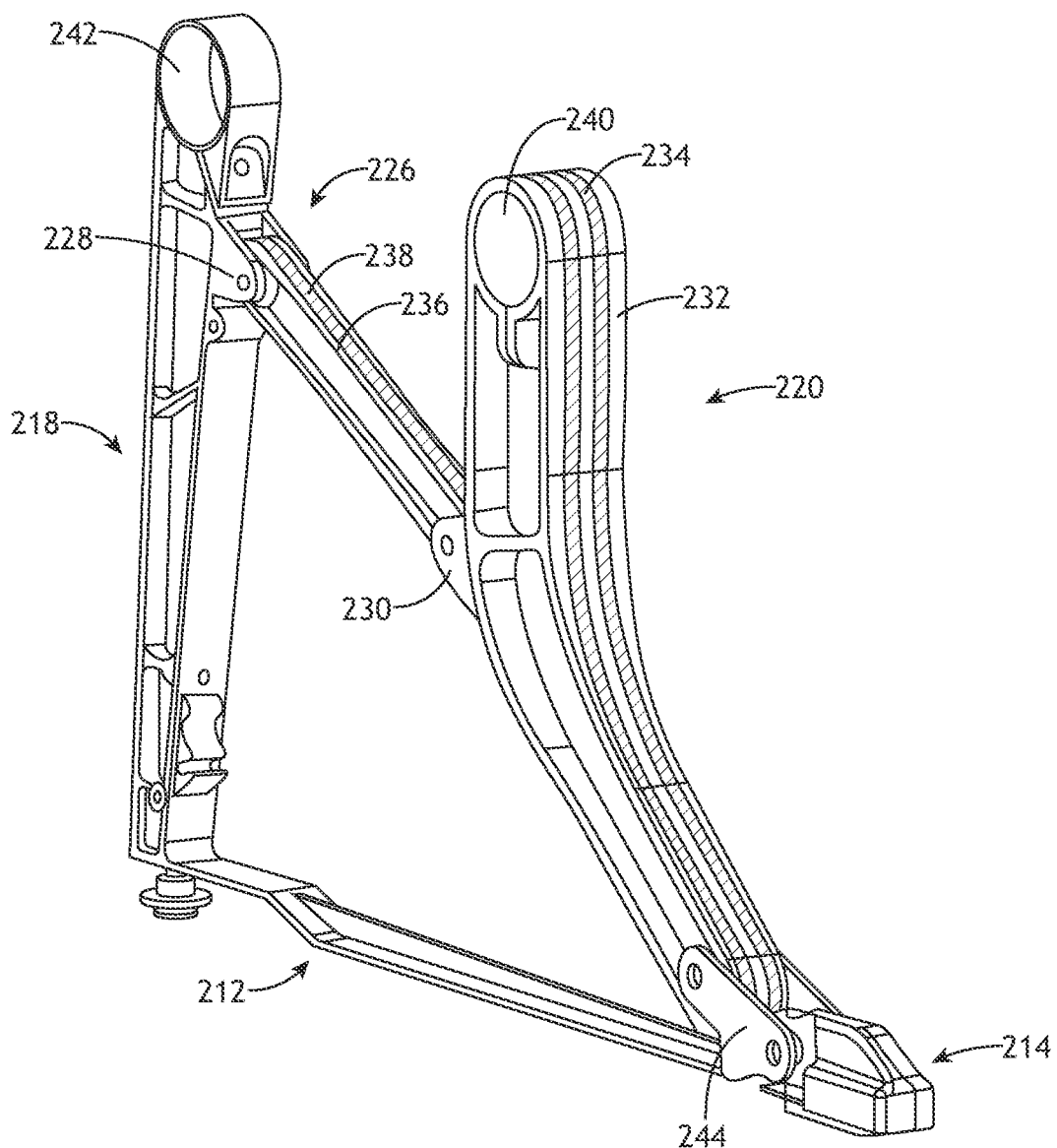
FIG. 3A illustrates a perspective view of a leg sub-assembly of the base assembly, in accordance with one or more embodiments of the disclosure.
Figure 3B:
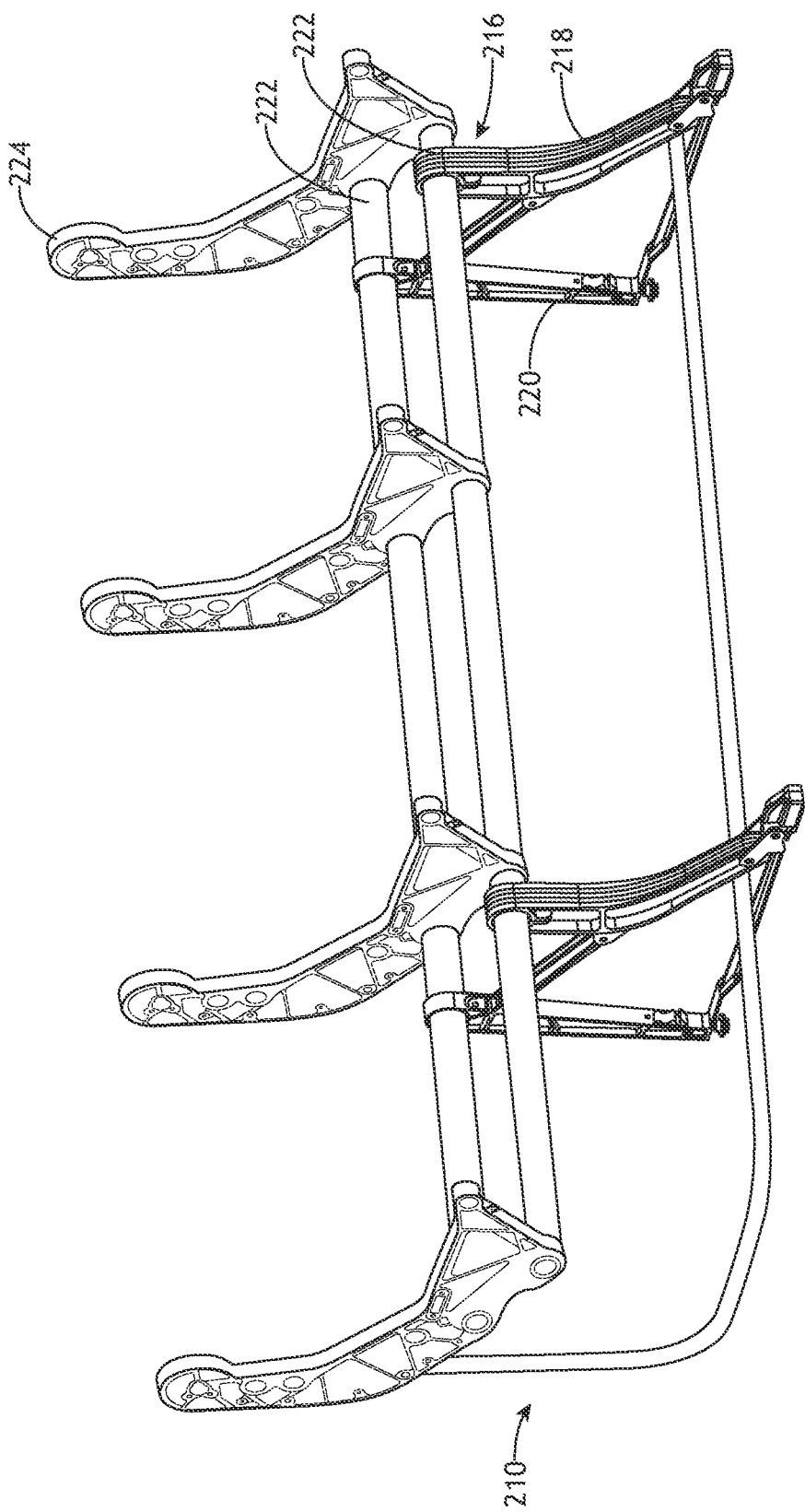
FIG. 3B illustrates a perspective view of a leg sub-assembly of the base assembly, in accordance with one or more embodiments of the disclosure.
Figure 3C:
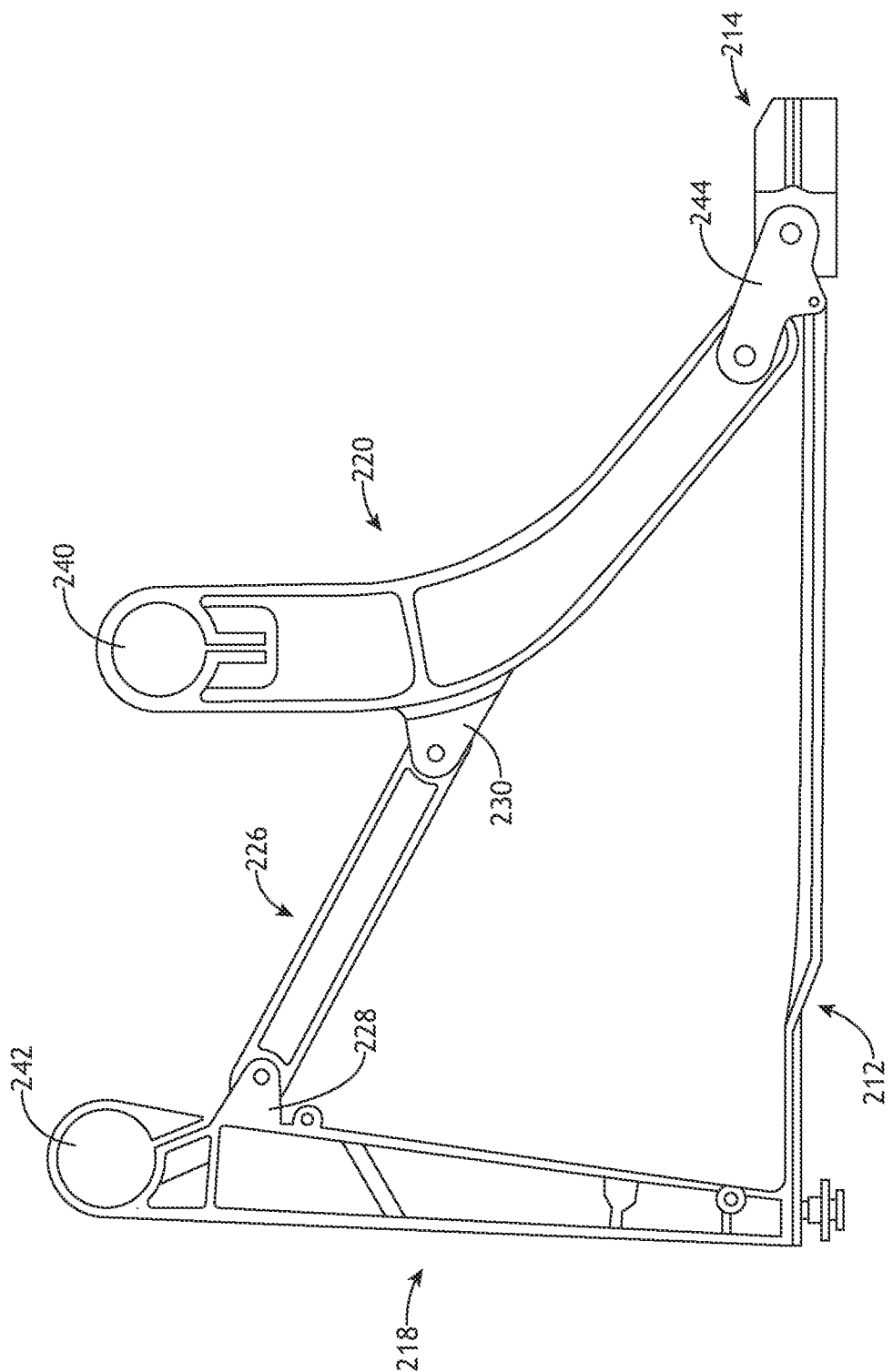
FIG. 3C illustrates a side view of a leg sub-assembly of the base assembly, in accordance with one or more embodiments of the disclosure.
Figure 3D:
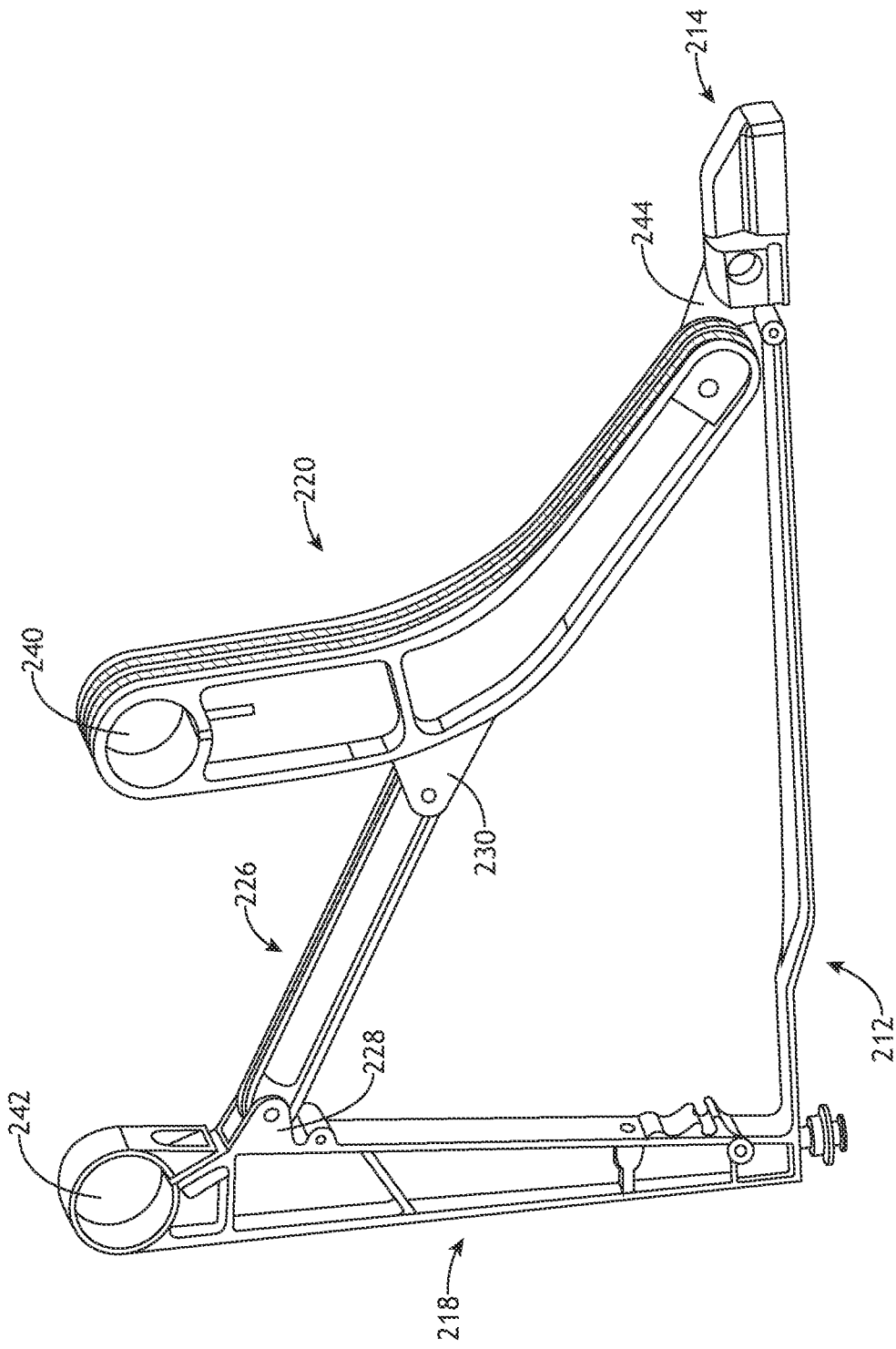
FIG. 3D illustrates a side perspective view of a leg sub-assembly of the base assembly, in accordance with one or more embodiments of the disclosure.
Figure 4:
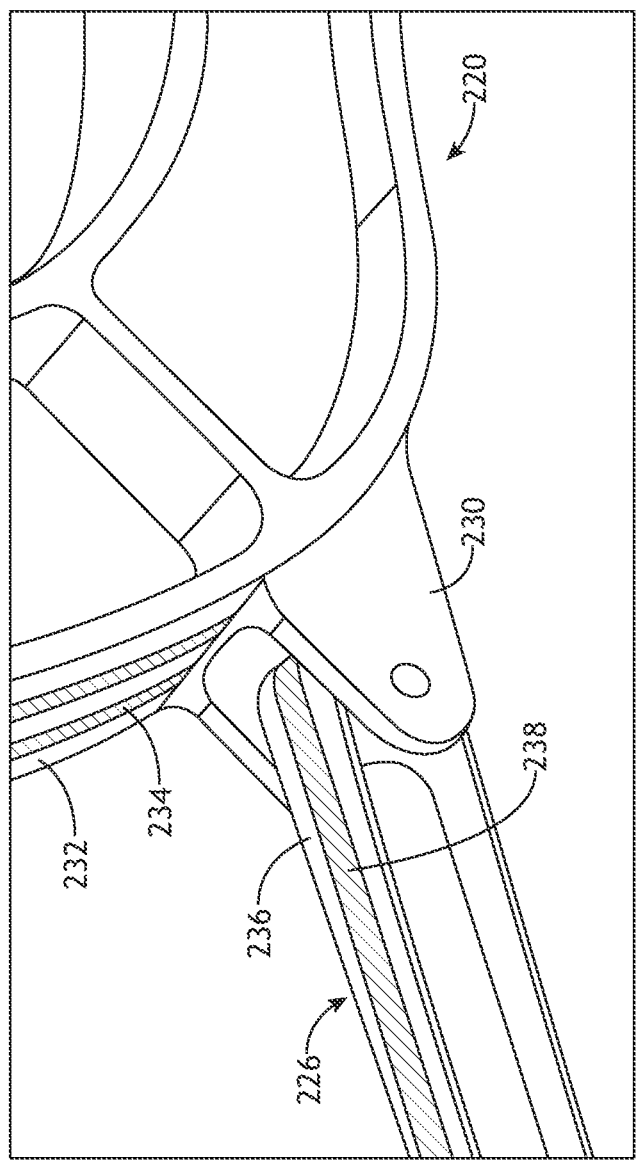
FIG. 4 illustrates a detailed view of a connection point of the leg sub-assembly, in accordance with one or more embodiments of the disclosure.
Figure 5A:
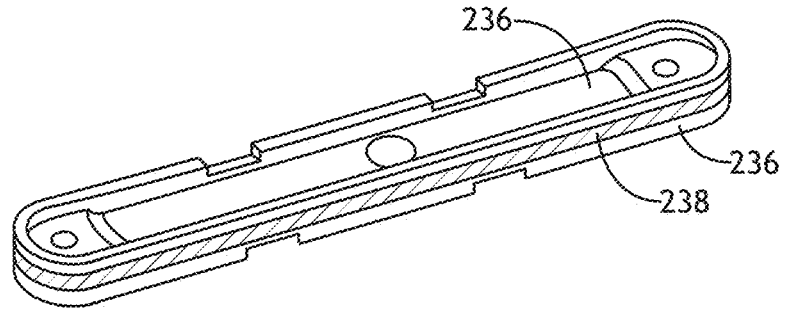
FIG. 5A illustrates a perspective view of a link beam of the leg sub-assembly, in accordance with one or more embodiments of the disclosure.
Figure 5B:
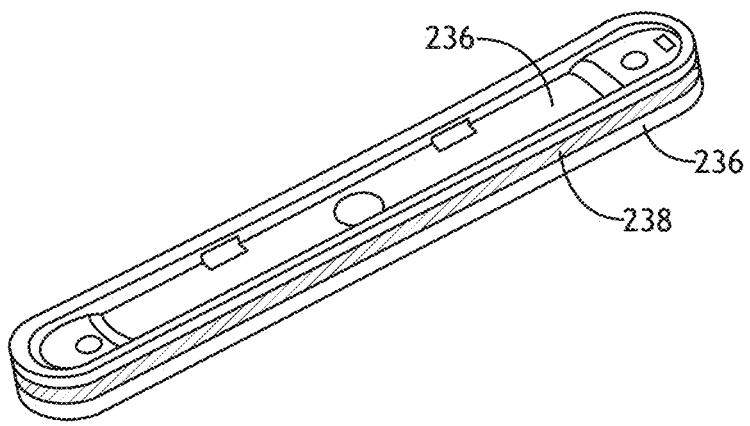
FIG. 5B illustrates a perspective view of a link beam of the leg sub-assembly, in accordance with one or more embodiments of the disclosure.
Figure 5C:
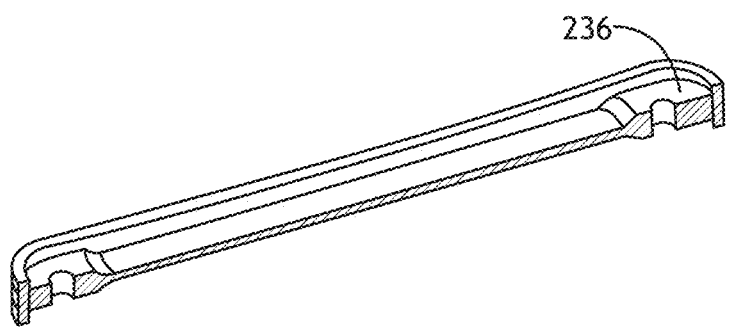
FIG. 5C illustrates a cross-sectional view of a link beam of the leg sub-assembly, in accordance with one or more embodiments of the disclosure.
Figure 6:
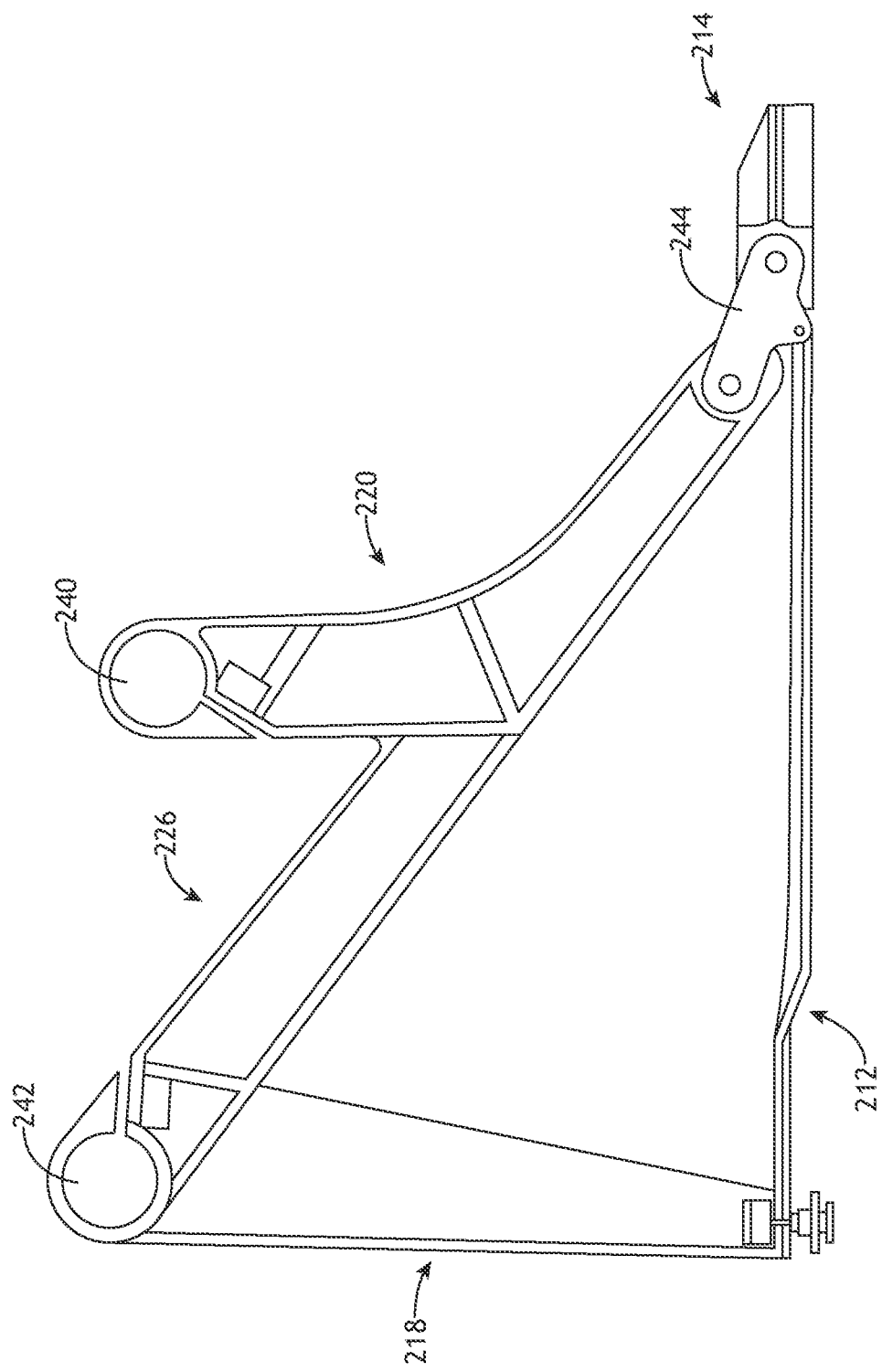
FIG. 6 illustrates a side view of a leg sub-assembly of a base assembly, in accordance with one or more embodiments of the disclosure.
Figure 7:
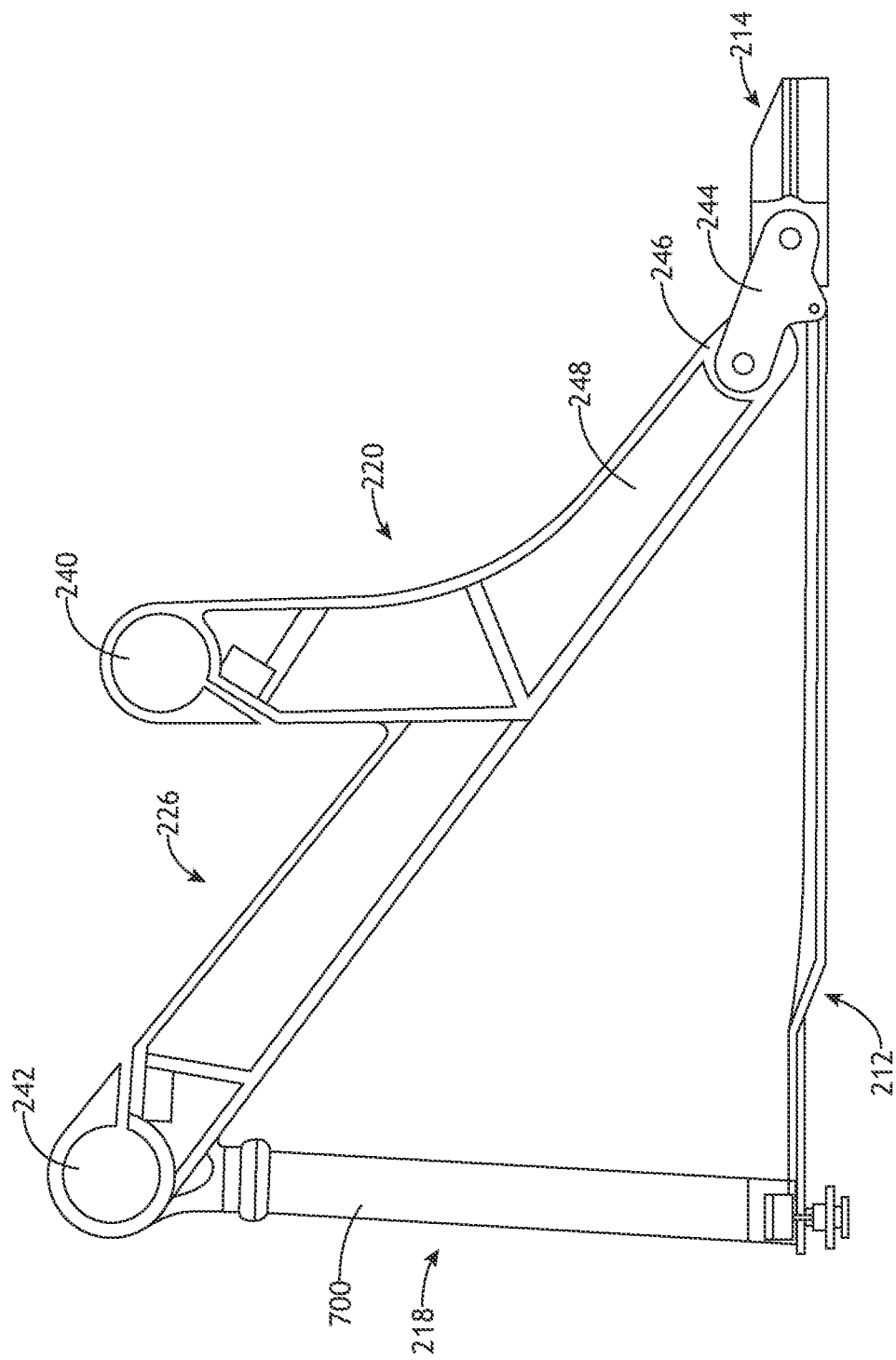
FIG. 7 illustrates a side view of a leg sub-assembly of a base assembly, in accordance with one or more embodiments of the disclosure.

FIGS. 3A-7 illustrate a base assembly 210 including one or more leg sub-assemblies 216, in accordance with one or more embodiments of the disclosure. In particular, FIG. 3A depicts a perspective view of a leg sub-assembly of the base assembly. In particular, FIG. 3B depicts a perspective view of a leg sub-assembly of the base assembly. In particular, FIG. 3C illustrates a side view of a leg sub-assembly of the base assembly. In particular, FIG. 3D depicts a side perspective view of a leg sub-assembly of the base assembly. In particular, FIG. 4 depicts a detailed view of a connection point of the leg sub-assembly. In particular, FIG. 5A illustrates a perspective view of a link beam of the leg sub-assembly. In particular, FIG. 5B depicts a perspective view of a link beam of the leg sub-assembly. In particular, FIG. 5C depicts a cross-sectional view of a link beam of the leg sub-assembly. In particular, FIG. 6 illustrates a side view of a leg sub-assembly of a base assembly. In particular, FIG. 7 depicts a side view of a leg sub-assembly of a base assembly.

Each leg sub-assembly 216 may include a link beam 226 configured to couple the front leg 218 to a portion of the rear leg 220. For example, the front leg 218 may include a connection portion 228 configured to couple to a first end of the link beam 226 and the rear leg 220 may include a connection portion 230 configured to couple to a second end of the link beam 220. In some embodiments, as shown in FIG. 6, the leg sub-assembly 216 may be a single piece, such that the front leg 218, the rear leg 220, and the link beam 222 are directly coupled to form a single piece.

At least one of the one or more legs may be formed of a hybrid composite material formed of two or more materials. For example, the rear leg 220 may be formed of a hybrid composite material formed of two or more materials. For instance, the rear leg 220 may include one or more first portions 232 formed of a first material and one or more second portions 234 formed of a second material. In this regard, the rear leg 220 may be formed of the first material and may include one or more belts 234 formed of the second material, where the one or more belts 234 may surround one or more portions of the first material to form the one or more first portions 232. By way of another example, the front leg 218 may be formed of a hybrid composite structure formed of two or more materials.

The link beam 226 may be formed of a hybrid composite structure formed of two or more materials. For example, the link beam 226 may include one or more first portions 236 formed of a first material and one or more second portions 238 formed of a second material. For instance, the link beam 226 may be formed of the first material and may include one or more belts 238 formed of the second material, where the one or more belts 238 may surround one or more portions of the first material to form the one or more first portions 236.

The two or more materials of the at least one leg of the one or more legs and the link beam 226 may include at least the first material and the second material, where the first material is different from the second material. For example, the first material may include a thermoplastic material and the second material may include a composite material. In one instance, the rear leg 220 may include one or more first portions 232 formed of a thermoplastic material and one or more second portions 234 formed of a composite material. In this regard, the rear leg 220 may be formed of the thermoplastic material and may include one or more belts 234 of composite material, where the one or more belts 234 of composite material may surround the thermoplastic leg to form the one or more first portions 232 of thermoplastic material. In another instance, the link beam 226 may include one or more first portions 236 formed of a thermoplastic material and one or more second portions 238 formed of a composite material. In this regard, the link beam 226 may be formed of the thermoplastic material and may include one or more belts 238 of composite material, where the one or more belts 238 of composite material may surround the thermoplastic link beam to form the one or more first portions 236 of thermoplastic material.

It is noted the first material may include any type of thermoplastic material. For example, the thermoplastic material may include a cycloaliphatic diamine dodecanedioic acid based thermoplastic material. By way of another example, the thermoplastic may include polyether ether ketone (PEEK). Further, the second material may include any type of composite material. For example, the composite material may include a continuous fiber material, such as, but not limited to, carbon, or the like.

It is noted that two or more materials (e.g., thermoplastic and composite) may be configured to provide both ductility and strength for the base assembly of the aircraft seat. For example, the composite portions may be configured to provide strength to withstand the load requirements (e.g., abuse, reliability, and dynamic load requirements (e.g., 4G lateral and 16 g FWD load requirements)), while the thermoplastic portions may be configured to provide ductility.

The second material of the two or more materials may be over-molded by the first material to form a thermoplastic over-molded composite structure. For example, the composite material (e.g., continuous fiber material) may be over-molded by the thermoplastic material to form a thermoplastic over-molded composite leg. For instance, the composite material (e.g., continuous fiber material) may be wrapped around one or more portions of an injection molded thermoplastic leg, such that the one or more legs include one or more belts of composite material around one or more portions of the thermoplastic injection molded thermoplastic legs. By way of another example, as shown in FIGS. 5A-5C, the composite material (e.g., continuous fiber material) may be over-molded by the thermoplastic material to form a thermoplastic over-molded composite link beam. For instance, the composite material (e.g., continuous fiber material) may be wrapped around one or more portions of an injection molded thermoplastic link beam, such that the link beam include one or more belts of composite material around one or more portions of the thermoplastic injection molded thermoplastic link beam.

The one or more legs may include one or more openings. For example, the rear leg 220 may include an opening 240. For instance, as shown in FIG. 2B, the opening 240 may include a rear opening configured to couple to a rear structural beam 222. By way of another example, the front leg 218 may include an opening 242. For instance, as shown in FIG. 2B, the opening 242 may include a front opening configured to couple to a front structural beam 222.

The one or more openings may be formed of the first material. For example, the opening 240 of the rear leg 220 may be formed of the first material. For instance, the opening 240 of the rear leg 240 may be formed of a thermoplastic material. In this regard, the thermoplastic opening 240 of the rear leg 220 may be configured to provide ductility for the leg sub-assembly of the base assembly.

The one or more connection portions may be formed of the first material. For example, the connection portion 228 of the front leg 218 may be formed of the first material. For instance, the connection portion 228 of the front leg 218 may be formed of a thermoplastic material. By way of another example, the connection portion 230 of the rear leg 220 may be formed of the first material. For example, the connection portion 230 of the rear leg 220 may be formed of a thermoplastic material. In this regard, the thermoplastic connection portions 228, 230 of the front and rear legs, respectively may be configured to provide ductility for the leg sub-assembly of the base assembly.

The rear leg 220 may couple to a floor fitting connection portion 244 configured to couple the rear leg 220 to a portion of the floor fitting 214. For example, the floor fitting connection portion 244 may be formed of the first material. For instance, the floor fitting connection portion 244 may be formed of the thermoplastic material. In this regard, the thermoplastic connection portion 244 coupled to the rear leg 220 may be configured to provide ductility for the leg sub-assembly of the base assembly.

One or more portions of the rear leg 220 may include one or more raised portions at one or more higher energy absorption zones. For example, the rear leg 220 may include one or more raised portions of thermoplastic material at one or more the connection portions. In one instance, as shown in FIG. 7, the rear leg 220 may include a raised portion 246 where the rear leg 220 couples to the floor fitting connection portion 244, such that the increased height of the raised portion 246 may be configured to provide high ductility at that particular high energy absorption zone. It is noted that the raised portion 246 may have an increased height relative to a height of a side wall 248 of the rear leg 22. In a non-limiting example, the height of the side wall 248 may be 16 mm and the height of the raised portion 246 may be 20 mm.

The front leg 218 may be formed of any material suitable for providing strength for the leg sub-assembly of the base assembly. For example, the front leg 218 may be formed of a thermoplastic material. By way of another example, the front leg 218 may be formed of a metal alloy (e.g., aluminum alloy). By way of another example, the front leg 218 may be formed of a composite material (e.g., carbon fibers). It is noted that the leg sub-assembly be formed of a plurality of components or the leg sub-assembly may be formed of a single piece (such as the assembly 600 shown in FIG. 6). In some embodiments, as shown in FIG. 7, the front leg 218 may include a tubular structure 700. For example, the tubular structure 700 may include a shaft formed of a metal alloy and one or more connection portions formed of thermoplastic material. For instance, the metal alloy and/or composite material may be configured to provide strength for the front leg 218 and the thermoplastic connection portions may be configured to provide ductility for the front leg 218 to absorb energy. As such, FIGS. 2A-7 are provided merely for illustrative purposes and shall not be construed as limiting the scope of the present disclosure.

It is noted the base assembly 210 and/or the leg sub-assembly 216 may be configured to work with any aircraft seat 200 and/or any set of components in the aircraft seat 200. For example, the base assembly 210 and/or the leg sub-assembly 216 may be configured to take into account any changes in shape of the components of the aircraft seat 200 (e.g., within an x-y plane forming a seating surface for an occupant), where the changes in shape may be caused by or otherwise dependent on the location of the aircraft seat 200 within the aircraft cabin.

Although embodiments of the disclosure illustrate the base assembly 210 and/or the leg sub-assembly 216 being integrated within the aircraft seat 200, it is noted, however, that the base assembly 210 and/or the leg sub-assembly 216 and/or components of the base assembly 210 and/or the leg sub-assembly 216 are not limited to the aviation environment and/or the aircraft components within the aviation environment. For example, the base assembly 210 and/or the leg sub-assembly 216 and/or components of the base assembly 210 and/or the leg sub-assembly 216 may be configured for any type of vehicle known in the art. By way of another example, the base assembly 210 and/or the leg sub-assembly 216 and/or components of the base assembly 210 and/or the leg sub-assembly 216 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A base assembly for an aircraft seat, the base assembly comprising:
   one or more leg sub-assemblies, each leg sub-assembly comprising:
   a front leg including a first link connection portion;
   a rear leg including a second link connection portion; and
   a link beam configured to couple the front leg to a portion of the rear leg, wherein the link beam includes at least a first sidewall arranged on a first side surface of the link beam and a second sidewall arranged on a second side surface of the link beam, wherein the link beam includes a first through hole on a first end of the link beam, wherein the first through hole penetrates through the first sidewall and the second sidewall, wherein the link beam includes a second through hole on the second end of the link beam, wherein the second through hole penetrates through the first sidewall and the second sidewall, wherein the first end of the link beam couples to the first connection link portion of the front leg via the first through hole and a second end of the link beam couples to the second connection link portion of the rear leg via the second through hole,
   at least one of the front leg or the rear leg at least partially formed of a hybrid composite structure, the link beam at least partially formed of the hybrid composite structure,
   the hybrid composite structure formed of at least a first material and a second material, where the first material is different from the second material, the first material including a thermoplastic material configured to provide ductility for the base assembly to absorb energy applied by a passenger load, the second material including a composite material configured to provide strength for the base assembly,
   the hybrid composite structure including one or more first portions formed of the thermoplastic material and one or more second portions formed of the composite material, where the composite material is over-molded over one or more sections of the thermoplastic material to form one or more belts of the composite material over the thermoplastic material to provide strength,
   wherein the first sidewall and the second sidewall of the link beam are formed of the thermoplastic material, wherein the first connection link portion of the front leg and the second connection link portion of the rear leg are formed of the thermoplastic material, wherein the thermoplastic material of the first sidewall directly abuts the thermoplastic material of the first connection link of the front leg to provide strength at a first connection point, wherein the thermoplastic material of the second sidewall directly abuts the thermoplastic material of the second connection link of the rear leg to provide strength at a second connection point, wherein the one or more belts of the composite material are arranged a select distance away from the first connection link portion of the front leg and the second connection link portion of the rear leg to provide ductility at the first connection point and the second connection point.

2. The assembly of claim 1, wherein the thermoplastic material includes polyether ether ketone (PEEK).

3. The assembly of claim 1, wherein the thermoplastic material includes a cycloaliphatic diamine dodecanedioic acid based thermoplastic material.

4. The assembly of claim 1, wherein the composite material includes a continuous fiber material.

5. The assembly of claim 4, wherein the continuous fiber material is formed of carbon fibers.

6. The assembly of claim 1, wherein a first portion of the link beam is integrated with the front leg and a second portion of the link beam is integrated with the rear leg to form an integrated leg sub-assembly.

7. The assembly of claim 1, wherein the front leg is formed of at least one of:
a metal alloy, a thermoplastic material, or a composite material.

8. The assembly of claim 1, wherein the rear leg includes an opening configured to couple to a rear structure beam of an aircraft seat, the opening formed of the first material.

9. The assembly of claim 1, wherein the front leg includes an opening configured to couple to a front structure beam of an aircraft seat, the opening formed of the first material.

10. The assembly of claim 1, wherein the base assembly further comprising:
one or more track covers; and
one or more floor fittings.

11. The assembly of claim 10, wherein the rear leg includes one or more raised portions formed of the first material.

12. The assembly of claim 11, wherein the rear leg includes a raised portion where the rear leg couples to a floor fitting connection portion of the base assembly, the floor fitting connection portion configured to couple to a portion of a floor fitting of the one or more floor fittings to couple the base assembly to a floor of an aircraft cabin.

13. An aircraft seat, the aircraft seat comprising:
a seatback;
a seat pan; and
a base assembly couplable to a floor of an aircraft cabin via one or more floor fittings, the base assembly including one or more leg sub-assemblies, each leg sub-assembly comprising:
a front leg including a first link connection portion;
a rear leg including a second link connection portion; and
a link beam configured to couple the front leg to a portion of the rear leg, wherein the link beam includes at least a first sidewall arranged on a first side surface of the link beam and a second sidewall arranged on a second side surface of the link beam, wherein the link beam includes a first through hole on a first end of the link beam, wherein the first through hole penetrates through the first sidewall and the second sidewall, wherein the link beam includes a second through hole on the second end of the link beam, wherein the second through hole penetrates through the first sidewall and the second sidewall, wherein the first end of the link beam couples to the first connection link portion of the front leg via the first through hole and a second end of the link beam couples to the second connection link portion of the rear leg via the second through hole, at least one of the front leg or the rear leg at least partially formed of a hybrid composite structure, the hybrid composite structure formed of at least a first material and a second material, where the first material is different from the second material, the hybrid composite structure including one or more first portions formed of the first material and one or more second portions formed of the second material, where the second material is over-molded by one or more portions of the first material to form one or more belts of the second material on the first material, the first material including a thermoplastic material configured to provide ductility for the base assembly to absorb energy applied by a passenger load, the second material including a composite material configured to provide strength for the base assembly, wherein the first sidewall and the second sidewall of the link beam are formed of the thermoplastic material, wherein the first connection link portion of the front leg and the second connection link portion of the rear leg are formed of the thermoplastic material, wherein the thermoplastic material of the first sidewall directly abuts the thermoplastic material of the first connection link of the front leg to provide strength at a first connection point, wherein the thermoplastic material of the second sidewall directly abuts the thermoplastic material of the second connection link of the rear leg to provide strength at a second connection point, wherein the one or more belts of the composite material are arranged a select distance away from the first connection link portion of the front leg and the second connection link portion of the rear leg to provide ductility at the first connection point and the second connection point.

* * * * *